United States Patent Office 3,138,205
Patented June 23, 1964

3,138,205
HYDRAULIC FRACTURING METHOD
John K. Kerver, Houston, and John W. Graham, Bellaire, Tex., assignors, by mesne assignments, to Jersey Production Research Company, Tulsa, Okla., a corporation of Delaware
Filed Dec. 14, 1960, Ser. No. 75,740
4 Claims. (Cl. 166—42)

This invention generally concerns hydraulic fracturing operations in wells. More particularly, the invention concerns a process for retaining fracturing propping agents, e.g., coarse sand, in place following hydraulic fracturing of a subsurface formation.

When oil and gas subsurface formations are hydraulically fractured to increase productivity, propping agents such as loose sand or gravel are employed to prop the fractures open once they have formed. However, often after fracturing a reservoir with fluid mixtures containing propping agents, difficulty is experienced because often these loose propping agents are produced back out of the fractures and into the well bore. This is undesirable because the propping agents are no longer in place to hold the fractures open, and the bulk of the propping agents are produced into the well bore, which causes accumulation of these agents in the well bore (sand-out) or movement of these agents to the earth's surface with consequent interference with tubings and other well equipment. Furthermore, while the hydraulic fracturing pressure is applied, the fractures are open fairly wide, and fluid flows into the formation at the rate of several barrels per minute; however, when injection ceases, the fractures tend to close, thereby reducing permeability drastically.

To maintain the fracture propping agents in place in the fractures and thus maintain the fractures open after the hydraulic fracture pressure application ceases in order to yield a high productivity well, the method of the invention provides for fracturing the subsurface formation with a fracturing fluid containing a propping agent and consolidating the propping agent in the fractures.

Thus, a primary object of the present invention is to provide a hydraulic fracturing technique especially adapted to retain propping agents employed in the fracturing operation in place. This and other objects and advantages of the invention will be apparent from a more detailed description thereof taken in conjunction with the drawings wherein:

FIGS. 1-4 are cross-sectional views of a portion of a well bore and illustrate the steps of the procedure of the invention.

Figure 1:
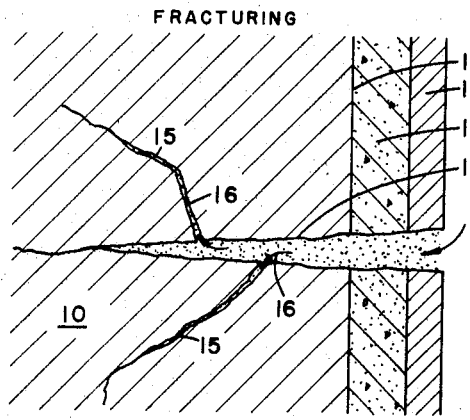
Figure 2:
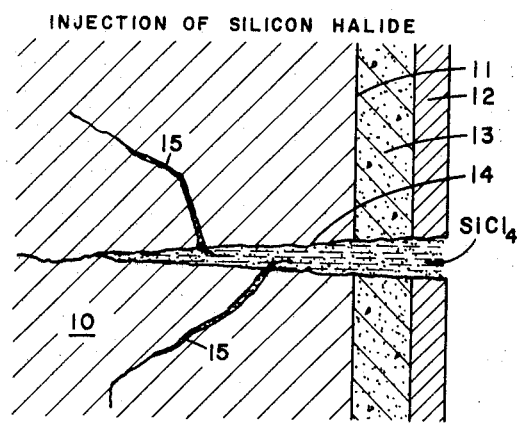
Figure 3:
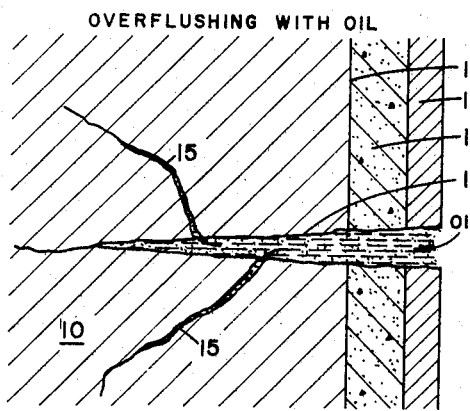
Figure 4:
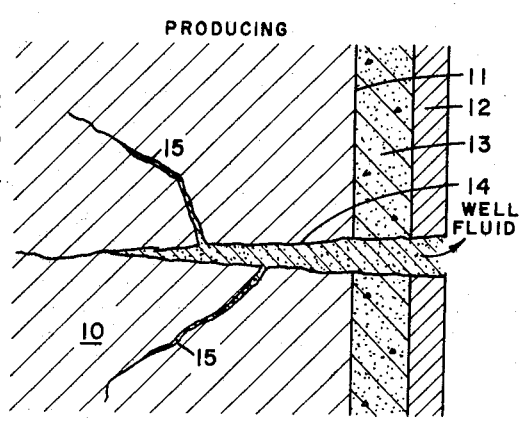

Referring to FIGS. 1-4 in greater detail, there is shown a subsurface oil or gas-containing formation 10 penetrated by a borehole 11. Casing 12 extends through bore hole 11 and is cemented therein by cement 13. Formation 10, casing 12, and cement 13 have been perforated as indicated by perforation 14 by any suitable means such as by a conventional jet-type or bullet-type gun perforator. Following perforation, hydraulic fracturing fluid is pumped into casing 12, and according to conventional procedure, sufficient hydraulic pressure is applied to the fracturing liquid column to force the liquid through perforations 14 to form fractures 15 in formation 10. This step is illustrated in FIG. 1. The fracturing liquid contains a propping agent 16, such as coarse sand or gravel, which acts to prop open the fractures 15 to assist in maintaining channels of flow after the formation has been fractured and to retain in place formation sands.

The fracturing liquid is preferably a low viscosity liquid; for example, crude oil may be employed alone as the fracturing liquid or a bodying agent may be added thereto. The bodying agent may comprise, for example, colloid materials, a metallic soap of an organic acid, a high molecular weight oil-soluble polyolefin such as a polypropylene, or a plastering agent such as a blown asphalt pitch or the like. Also, the fracturing material may be in the form of a gel rather than a liquid, suitable gels being, for example, a mixture of metal soaps and hydrocarbons such as fuel oil, crude oil, and lighter fractions of crude petroleum. Further, suitable organic compounds of the plastic group which have the property of reverting to a nonviscous condition with the passage of time or through the action of certain chemicals or through appropriate changes in temperature or pressure are suitable as the fracturing liquid containing the propping agent.

About 3% to 15% by volume of a water containing a foaming agent or interfacial tension reducer is added to a dry fracture sand (propping agent). This treated sand is added to the fracturing liquid, e.g., oil, and the formation is fractured in the normal manner. Then, a solution of a silicon halide dispersed in an inert oil carrier is injected into the formation fractures, after which the fractured zone is overflushed with oil. It is preferred to inject the halide without reducing the fracturing pressure or halting fluid injection if fracturing and treating are to be carried out at the same time; however, if desired, the pressure on the fracture fluid can be reduced or injection halted prior to the treating step.

The foaming agent or interfacial tension reducer, i.e., surface-active or wetting agent, preferably is one of the anionic type; e.g., the reaction product of tall oil and methyl taurine, a commercial product which is an anionic amine neutralized surfactant; alkyl aryl sulfonates, which are marketed under the trade names of Tide and Chiffon detergents; and other anionic surfacting agents of a similar type. Other anionic surfactants that may be used are the salts of alkyl aryl sulfonates; e.g., sodium xylene sulfonate, keryl benzene sulfonate, monobutyl biphenyl sulfonate, which sodium salts are known as Naxonate G, Kreelon 4D, and Areskap 300, respectively. Alkyl sulfates such as Tergitol 08, which is the sodium sulfonate of 2-ethyl hexanol-1, also may be used.

Other useful anionic surface-active agents include the alkyl sulfonates such as Tergitol EH, which is sodium sulfonate of 2-ethyl hexanol, Petrowet R and Duponol 189, both aliphatic hydrocarbon sodium sulfonates, sulfonated amides, and amines as illustrated by Igepon TK-42, sodium N-methyl-N-octyl taurate, Dianol N, and Sulframin DHL, both fatty amide sulfonates, sulfated, and sulfonated esters known to the trade as Nekal NS, trihexyl sulfotricarbyllate, and Triton X-200, an alkyl aryl ester sulfonate. Where the metallic ion of the salt is not given, it is to be understood that the sodium salt is used. The amount of surface-active agent employed may range from about 0.02% to about 5% by weight based on the water. A preferred amount may range from about 0.2% to about 2% by weight.

Another fracturing procedure that allows the carrier fluid to be water comprises the steps of suspending the dry fracture sand in a solution of the anionic surfactant and fracturing the formation, followed by flushing the fracture with oil to reduce the water saturation to irreducible minimum, which would leave about 3% to 15% by total volume of water. Then, the treatment of the fractures with silicon halide follows.

The liquid silicon halide preferably is a chloride such as silicon tetrachloride. However, other halides may be used, such as the high molecular weight chlorides of silicon as exemplified by silicon hexachloride or octachloride.

U.S. patent application Serial No. 791,320 by John K. Kerver et al., entitled "Stabilizing Consolidated Sands,"

filed February 5, 1959, now U.S. Patent No. 3,070,161, provides a discussion of the reaction product between water and silicon tetrachloride. In a formation fractured with a liquid silicon halide such as silicon tetrachloride, it is believed that the silicon tetrachloride reacts with water in the pores of the sand to cause the formation of an amorphous siliceous compound. The precipitate which results has

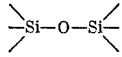

linkages which are neither systematic nor continuous. This structure has a random nature in the configuration of hydroxyl groups. Many of the hydroxyl groups are in position for further reaction, and many of the hydroxyl groups are located so that reaction with other hydroxyl groups will be difficult or impossible in conventional treatment. The structure contains many random spaced hydroxyl groups, and these hydroxyl groups cause the material to be susceptible to peptization or solution in flowing water and account for the instability of the consolidation treatment unless a stabilization step is included when the well produces water. In the stabilization step, the fractures are treated with a reagent which renders the fracture preferentially wet with hydrocarbons and prevents instability of the fractured formation to flow of water. Thus, water flow is prevented from contacting the hydroxyl groups, and the consolidated zones remain in a stabilized condition. It is believed that concurrent with the initial reaction between the water and the excess of silicon tetrachloride there is incorporated in the hydrous mass a substantial number of silicon atoms with 1, 2, or 3 chlorine atoms still unreacted. Since all of the water is used up in the initial reaction and a large amount of silicon tetrachloride may remain unreacted, there may be competing reactions between the dehydration and inter-reaction of two hydroxyl groups and the reaction between the hydrogen of the hydroxyl group and additional silicon tetrachloride. That is, a silicate oxygen complex containing few, if any, hydroxyls and a large number of reactive chlorine atoms may result initially.

Thus, for the treating reagent in the procedure of the process of the invention to be effective, especially when an organohalosilane is employed, the chlorine atoms must be converted to hydroxyls, but there should be little, if any, free water present. Consequently, sufficient time should be allowed for treatment of the fractures with the oil solution of silicon halide. The time of contact should be sufficiently long to convert the silicon halide to the amorphous hydrated silicate, but not of sufficient duration to permit formation of any substantial number of hydroxyls to chlorine-containing radicals. The time of contact for treatment with the silicon halide may therefore be from about 5 minutes to about 120 minutes. Also, to allow the organohalosilane, when it is employed as the treating reagent, to penetrate the hydrous siliceous structure and react with the hydroxyls, it is necessary to provide a suitable time for contact with the organohalosilane, and this may range from about 30 minutes up to about 48 hours.

Two alternative methods may be used to eliminate the time dependency of the silicon tetrachloride treatment. In one, the excess silicon tetrachloride may be removed, and the chlorine-containing radicals converted to (OH) groups by flushing with water, followed by displacement of the water with oil. In the other, the silicon tetrachloride treated formation is flushed with an aliphatic alcohol containing about 8% water. This treatment removes the Cl radicals and in turn is miscibly displaced by an oil slug followed by the oil solution of the silane. Thus, the desired hydroxyl groups are formed without leaving any free water to react with the silane.

Several experiments were performed to illustrate the operation of the invention. In one laboratory experiment, 50 cc. of 20–40 mesh frac sand was treated with 5 cc. of water containing 2% NaCl and 1% Tide, an alkyl-aryl sulfonate which promotes water wetting. This amount represents about 20% saturation with water, as the sand packed in this manner has a porosity of about 50%, or 25 cc. pore volume. The wetted sand was admixed with kerosene in the ratio of 1 lb. sand per gal. kerosene, and this mixture then was flowed into a metal tube 1 in. in diameter and 3 in. long, having a $\frac{1}{32}$-in. taper over the length of the tube. After a sufficient volume of the suspension or mixture was flowed into the tube to fill and pack it with sand, a 20% solution of $SiCl_4$ in kerosene was flowed through the sand in order to consolidate it. It was found following consolidation of the frac sand that there was no perceptible difference in the rate of flow of kerosene through the sand at constant pressure differential. Also, it was found that a metal piston $1\frac{5}{16}$ in. in diameter inserted in the small-diameter end of the tapered tube required a pressure of 470 p.s.i. to dislodge the sand particles in the tube. In the fracture sand in a well, a fluid pressure gradient of 470 p.s.i. over 3 in. would be impossible. Consequently, the treatment would be adequate for well operations, because the fracture created would not have smooth tapered sides as the tube used in this test had.

A large portion of the formations where hydraulic fracturing is most effective are carbonate rocks. During the reaction between the water on the frac sand and the $SiCl_4$, HCl is produced, which will attack the carbonate rock. The following experiments were conducted to ascertain if this reaction would have any deleterious effect on the consolidation of the frac sand. Fractured limestone was simulated in the laboratory by splitting lengthwise two 1-in. diameter Indiana limestone cores. These split cores were placed in cylindrical metal holders so that a rectangular fracture 3 in. long, 1 in. wide, and $\frac{1}{10}$ in. thick was produced. In one of the tests, dry sand was packed into the fracture, then flushed with water, and then with kerosene, following which it was treated with a 20% solution of $SiCl_4$ in kerosene. Another sample was treated by flowing kerosene containing 1 lb. of water-wet frac sand per gal. of kerosene into the fracture until it was completely filled with the sand and the fracture then overflushed with kerosene. After this, the sand was consolidated with a solution of 20% $SiCl_4$ in kerosene. In both of these tests, it was found that little, if any, difference in the flow rate of kerosene through the treated sand compared with the untreated sand could be detected. In both cases the sand was well consolidated and was not removed by back-flow of kerosene. Upon removal of the core from the holder, it was found that there was little, if any, bonding between frac sand and the limestone. The lack of bonding appears to be the result of the reaction between the produced HCl and the limestone. No other deleterious effect of the acid was observable.

A third fracture was made by spacing two half cylinders of Indiana limestone with $\frac{3}{16}$ in. glass rods and assembled with wire screens and plastic fittings cemented together with epoxy resin to make an integral unit with a fracture $\frac{3}{16}$ in. wide. This fracture was packed with dry sand, flushed with water, then kerosene, and treated with 20% $SiCl_4$ in kerosene. After consolidation, kerosene was flowed through the treated sand at a rate of 8 cc. per second. This is equivalent to production of 4 b./d. through a fracture having an area of only $\frac{3}{16}$ square in. No sand was dislodged from the fracture at this rate of flow.

A well completed in the Buda lime section was fractured using 40,000 lbs. sand and 40,000 gal. fresh water at a rate of 17 b./min. Because of a "screen-out," not quite all the volume was injected. When placed on production, the well could not be produced for more than one day at a time, because the sand flowed out of the induced fracture into the well bore. It was decided to treat the sand in accordance with the method of the present invention.

The following procedure was used. Sand was washed from the well bore with salt water, and when complete, the salt water was displaced with diesel oil. Injectivity was tested, and any water in the well bore was displaced by squeezing 10 bbls. diesel oil into the formation at a rate of 1 bbl. per minute with a 1450 p.s.i. pressure. Twenty-three barrels of 11.6% solution of $SiCl_4$ were spotted opposite the perforations, and 22 barrels were squeezed into the formation in 28 minutes at a maximum pressure of 1175 p.s.i. A slow rate was used in an effort to direct the fluid into the most permeable channel, which should be the fracture. The well was allowed to remain shut-in 1 hour, and then 7 additional barrels consisting of 1 barrel $SiCl_4$ solution and 6 barrels diesel oil were injected.

When production was commenced the next day, the well produced fluid containing 14% water and no sand. Three weeks later, the fluid contained 6% water and was producing at the allowable rate of 30 b./d. of oil with no trouble experienced from sand flowing from the fracture. This treatment is considered successful in that fracture sand does not now interfere with production; whereas prior to treatment, the well had to be cleaned out almost daily.

In another well completed through perforations in 2⅞-in. casing (the so-called tubingless completion) and fractured with 10,000 gal. lease crude containing 20,000 lbs. water-wet sand at 2,800 p.s.i. with a rate of 13 b./min., 132 bbls. were produced on bleeding down, and then it sanded up. Sand was reverse circulated, and the well was treated according to the method of the present invention as follows. Injectivity was tested with 5 bbls. diesel oil at a rate of 1 b./min. and a pressure of 1700 p.s.i. 11.6% $SiCl_4$ solution at 1 b./min. and 2000 p.s.i. were injected until 22 bbls. were displaced, after which the formation was treated using an overflush of 6 bbls. diesel oil. A stabilizing chemical treatment composed of 5 bbls. isopropyl alcohol, 10 bbls. diesel oil, 7 bbls. silane solution (20 gal. dodecyltrichlorosilane in 6½ bbls. diesel oil) was injected in the order shown at a rate of 1¼ b./min. at 2400 p.s.i. The well was shut in overnight, and then the formation was overflushed with 6 bbls. of diesel oil and 14 bbls. of lease crude.

On starting production, the well flowed a short time and died. A pump was installed and production resumed. On the following day, the pump was stopped for adjustment and on resuming operation was found to be stuck. When the pump was pulled, very little sand was found in it. This cycle was repeated twice, and each time only a very small amount of sand was found. This sand was believed to be a small amount that could not be circulated from the well after the original sand-up on completion. A new pump was run, and the well now is producing 22 bbls. oil per day with 80% water—a total of 110 bbls. fluid per day, with no trouble from sand. It is to be noted that this treatment included the step of stabilizing the consolidation with the organochlorosilane.

Having fully described the nature, operation, and objects of our invention, we claim:

1. A method for fracturing a subsurface formation comprising initially wetting a propping agent with water containing a surfactant; suspending said wetted propping agent in an oil base fracture fluid; fracturing a subsurface formation with said fracture fluid by forcing said fracture fluid and propping agent into said formation under pressure; said fractures containing an amount of water equivalent to irreducible minimum water saturation; then overflushing said fractured formation with a liquid hydrocarbon containing a silicon chloride in concentrations and amounts sufficient to react with all of the water present in said fractures to consolidate in place said propping agent; and injecting an organohalosilane into said fractures containing said consolidated propping agent to render the fractures preferentially wet with hydrocarbons and prevent instability of the fractured formation to flow of water.

2. A method for fracturing a subsurface formation comprising suspending a propping agent in a water base fracture fluid containing a surfactant; fracturing a subsurface formation with said fracture fluid by forcing said fracture fluid and propping agent into said formation under pressure; overflushing said formation following fracture thereof with liquid hydrocarbons in sufficient volume to reduce the water saturation to irreducible minimum; and then overflushing said fractured formation with a liquid hydrocarbon containing a silicon chloride in concentrations and amounts sufficient to react with all of the water present in said fractures to consolidate in place said propping agent.

3. A method for fracturing a subsurface formation comprising initially wetting a propping agent with water containing a surfactant; suspending said wetted propping agent in an oil base fracture fluid; fracturing a subsurface formation with said fracture fluid by forcing said fracture fluid and propping agent into said formation under pressure; said fractures containing an amount of water equivalent to irreducible minimum water saturation; and then overflushing said fractured formation with a liquid hydrocarbon containing a silicon chloride in concentrations and amounts sufficient to react with all of the water present in said fractures to consolidate in place said propping agent.

4. A method for fracturing a subsurface formation comprising suspending a propping agent in a water base fracture fluid containing a surfactant; fracturing a subsurface formation with said fracture fluid by forcing said fracture fluid and propping agent into said formation under pressure; overflushing said formation following fracture thereof with liquid hydrocarbons in sufficient volume to reduce the water saturation to irreducible minimum; then overflushing said fractured formation with a liquid hydrocarbon containing a silicon chloride in concentrations and amounts sufficient to react with all of the water present in said fractures to consolidate in place said propping agent; and injecting an organohalosilane into said fractures containing said consolidated propping agent to render the fractures preferentially wet with hydrocarbons and prevent instability of the fractured formation to flow of water.

References Cited in the file of this patent

UNITED STATES PATENTS

| | | |
|---|---|---|
| 2,019,908 | Kennedy et al. | Nov. 5, 1935 |
| 3,070,161 | Kerver | Dec. 25, 1962 |

FOREIGN PATENTS

| | | |
|---|---|---|
| 201,013 | Austria | Dec. 10, 1958 |